United States Patent
Chae

(10) Patent No.: US 12,113,255 B2
(45) Date of Patent: Oct. 8, 2024

(54) ELECTROLYTE MEMBRANE FOR MEMBRANE-ELECTRODE ASSEMBLY INCLUDING SELF-ASSEMBLED BLOCK COPOLYMER

(71) Applicants: Hyundai Motor Company, Seoul (KR); Kia Corporation, Seoul (KR)

(72) Inventor: Il Seok Chae, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 184 days.

(21) Appl. No.: 17/495,041

(22) Filed: Oct. 6, 2021

(65) Prior Publication Data
US 2022/0166044 A1  May 26, 2022

(30) Foreign Application Priority Data
Nov. 24, 2020 (KR) ........................ 10-2020-0158595

(51) Int. Cl.
| | | |
|---|---|---|
| *H01M 8/1044* | (2016.01) | |
| *C08F 212/14* | (2006.01) | |
| *C08F 220/36* | (2006.01) | |
| *C08F 220/38* | (2006.01) | |
| *C25B 1/04* | (2021.01) | |
| *C25B 9/19* | (2021.01) | |
| *C25B 13/08* | (2006.01) | |
| *H01M 8/1004* | (2016.01) | |
| *H01M 8/103* | (2016.01) | |
| *H01M 8/1034* | (2016.01) | |
| *H01M 8/1051* | (2016.01) | |

(52) U.S. Cl.
CPC ......... *H01M 8/1004* (2013.01); *C08F 212/26* (2020.02); *C08F 212/30* (2020.02); *C08F 220/36* (2013.01); *C08F 220/382* (2020.02); *C25B 1/04* (2013.01); *C25B 9/19* (2021.01); *C25B 13/08* (2013.01); *H01M 8/103* (2013.01); *H01M 8/1034* (2013.01); *H01M 8/1051* (2013.01)

(58) Field of Classification Search
CPC .. H01M 8/1004; H01M 8/103; H01M 8/1034; H01M 8/1051; C08F 212/30; C08F 212/26; C08F 220/382; C08F 220/36; C25B 9/19; C25B 1/04; C25B 13/08
See application file for complete search history.

(56) References Cited

U.S. PATENT DOCUMENTS

| | | |
|---|---|---|
| 2010/0261091 A1 | 10/2010 | Lee et al. |
| 2014/0335440 A1 | 11/2014 | Kunita et al. |
| 2015/0295262 A1* | 10/2015 | Kunita ............... C08L 71/00 |
| | | 429/492 |

FOREIGN PATENT DOCUMENTS

| | | |
|---|---|---|
| JP | 4876407 B2 | 2/2012 |
| JP | 4910310 B2 | 4/2012 |
| JP | 5023475 B2 | 9/2012 |

(Continued)

OTHER PUBLICATIONS

D. E. Curtin et al., J. Power Sources, 131, 41-48 (2004).

(Continued)

*Primary Examiner* — James Lee
(74) *Attorney, Agent, or Firm* — Fox Rothschild LLP

(57) ABSTRACT

Disclosed is an electrolyte membrane for a membrane-electrode assembly including a block copolymer composed of a hydrophilic domain and a hydrophobic domain.

16 Claims, 2 Drawing Sheets

(56) References Cited

FOREIGN PATENT DOCUMENTS

| KR | 101195910 B1 | 10/2012 |
| KR | 2014-0128329 A | 11/2014 |
| KR | 101926169 B1 | 12/2018 |

OTHER PUBLICATIONS

A. P. Young et al., J. Electrochem. Soc., 157, B425-B436 (2010).
P. Trogadas et al., Electrochem. Solid-State Lett., 11, B113-B116 (2008).
R. Uegaki et al., J. Power Sources, 196, 9856-9861 (2011).
D. Zhao et al., J. Power Sources, 190, 301-306 (2009).
R. W. Cahn et al., Mater. Sci. & Technol., Ch. 10, Wiley-VCH Verlag, GmBH (2000).
E. Endoh, ECS Trans., 16, 1229-1240 (2008).
E. Endoh, Handbook of Fuel Cells-Fundamentals, Technology and Applications, John Wiley & Sons, Ltd. (2010).
D. Banham et al., J. Electrochem. Soc., 161, F1075-F1080 (2014).
M. A. Hasan et al., Appl. Catal. A: General, 181, 171-179 (1999).
D. Zhao et al., J. Membr. Sci., 346, 143-151 (2010).
L. Gubler and W. H. Koppenol, J. Electrochem. Soc., 159, B211-B218 (2012).
Transition Metal Catalyst)[P. Trogadas et al., J. Mater. Chem., 21, 19381-19388 (2011).
M. Aoki et al et al., Electrochem. Commun. 8, 1509-1513 (2006).
N. Macauley et al., Electrochem. Lett., 2(4), F33-F35 (2013).
J. Song et al., Angew. Chem. Int. Ed., 54, 3615-3620 (2015).
L. J. Small et al., J. Electrochem. Soc., 166, A2536-A2542 (2019).
T. D. Gierke et al., J. Membr. Sci. 1983, 13, 307.
I. S. Chae et al., J. Mater. Chem. A, 1, 9608-9611 (2013).
Bilir et al., "Novel Partially Fluorinated Graft Black Copolymer Ionomer as Potential Proton Echange Membrane Material," Elsevier Ltd., 95:91-101, Feb. 16, 2016.

\* cited by examiner

ELECTROLYTE MEMBRANE FOR MEMBRANE-ELECTRODE ASSEMBLY INCLUDING SELF-ASSEMBLED BLOCK COPOLYMER

CROSS-REFERENCE TO RELATED APPLICATION

This application claims under 35 U.S.C. § 119(a) the benefit of priority to Korean Patent Application No. 10-2020-0158595 filed on Nov. 24, 2020, the entire contents of which are incorporated herein by reference.

TECHNICAL FIELD

The present invention relates to an electrolyte membrane for a membrane-electrode assembly including a block copolymer composed of a hydrophilic domain and a hydrophobic domain.

BACKGROUND

A proton exchange membrane fuel cell (PEMFC) basically includes an anode, which is a hydrogen fuel, a cathode, to which oxygen is supplied, and a polymer electrolyte membrane disposed between two electrodes, and such a configuration is called a membrane-electrode assembly (MEA). The reaction for generating electricity of a fuel cell is that the hydrogen supplied to the anode is separated into proton and electron, and then the proton moves toward the cathode through the membrane, and the electron moves to the cathode through an external circuit, such that oxygen molecules, the protons, and the electrons are reacted on the cathode to generate electricity and heat and generate water ($H_2O$) as a reaction by-product.

Here, the polymer electrolyte membrane serves to transfer the proton generated by the anode to the cathode and serves as a diaphragm not allowing hydrogen, which is the fuel, to directly meet oxygen. Generally, the electrolyte membrane composed of perfluorinated sulfonic acid ionomer (PFSA) is the most commonly used electrolyte membrane in the polymer electrolyte membrane fuel cell field due to the high performance and stability in the high proton conductivity and various humidification conditions. However, in the pure perfluorinated sulfonic acid ionomer electrolyte membrane, there are many problems in that thermal degradation easily occurs at the temperature of 100° C. or greater and the proton conductivity is also low, thereby rapidly decreasing the mechanical and dimensional stability and the like. For this reason, the operation of the fuel cell using the general perfluorinated sulfonic acid ionomer electrolyte membrane is generally used only in a range of less than 100° C., preferably, 80° C. or less. Further, since the proton conductivity depends on the exchange of the proton through sulfonic acid applicator (—$SO_3H$ group) in the presence of moisture, it is necessary to optimally maintain the hydration level of the polymer electrolyte membrane.

Generally, hydrogen and oxygen of the air, which are reaction gases of the fuel cell, crossover through the electrolyte membrane to promote the generation of hydrogen peroxide (HOOH), in which the hydrogen peroxide generates highly reactive oxygen-containing radicals such as hydroxyl radical ($^-$OH) and hydroperoxyl radical ($^-$OOH). The radicals cause the chemical degradation of the membrane and the electrode by attacking the ionomer in the perfluorinated sulfonic acid-based electrolyte membrane and electrode, thereby eventually having an adverse effect of decreasing the durability of the fuel cell.

Conventionally, as a technology of mitigating the chemical degradation, a method for adding various kinds of antioxidants has been proposed. The antioxidants may use primary antioxidant having a radical scavenger or quencher function and secondary antioxidant having a hydrogen peroxide decomposer function alone, respectively or interchangeably use them. In the general polyolefin-based plastic industry, the primary antioxidant includes phenolic antioxidants, monophenolic-bisphenolic polymeric phenolic antioxidants and amine-based antioxidants. As the secondary antioxidant which is the peroxide decomposer, sulfur-based antioxidant and phosphorus antioxidant are reported. For example, since polypropylene is oxidized more easily than polyethylene, it is known that it is practical to use polypropylene in combination with the secondary antioxidants such as the phenolic antioxidants of 2.6-di-t-Butyl-4-methylphenol (BHT) of 0.1 to 1.0%, dilauryl thiodipropionate, and distearyl thiodipropionate.

As the representative primary antioxidants used in the perfluorinated sulfonic acid electrolyte membrane and ionomer for the fuel cell, cerium group such as cerium (III) nitrate hexahydrate or cerium oxide or ceria are known. Further, as the secondary antioxidants, there are manganese antioxidants such as manganese oxide and transition metal catalyst such as platinum (Pt).

However, when the metal salt form is used as the primary or secondary antioxidants, the metal ions are bonded to the terminal of the sulfonic acid group of the perfluorinated sulfonic acid ionomer to block the path through which the proton may move. Further, the particles of several ten to several hundred nano sizes of the metal or the metal oxide block the hydrated microchannel of the electrolyte membrane to disturb the movement of the proton. Therefore, generally, the use of the antioxidants of the metal salt or metal form improves the chemical durability of the electrolyte membrane but on the contrary, may decrease the proton conductivity of the electrolyte membrane.

In the related art, antioxidants has been developed by using organic oxidation-reduction compounds which has the standard oxidation reduction electric potential in a range of 0.68 [V] to 1.00 [V], as the antioxidants other than the metal or the metal salt in the fuel cell. For example, TEMPO ((2,2,6,6-Tetramethylpiperidin-1-yl)oxyl) compounds having nitroxide radical group (N—O$^-$) are the primary and secondary composite organic antioxidants serving as the primary antioxidants capable of converting the hydroxyl radical into hydroxide (OH$^-$) as expressed in Reaction Formula 1 below and serving as the secondary antioxidants which is the hydrogen peroxide decomposer as expressed in Reaction Formula 2 below.

[Reaction Formula 1]

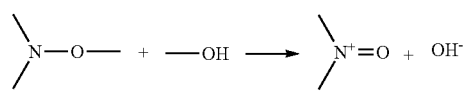

[Reaction Formula 2]

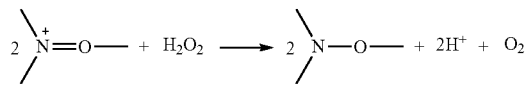

However, there are disadvantages in that the organic oxidation-reduction compounds having low molecular weight are not immobilized to the electrolyte membrane during the operation of the fuel cell and may be easily diffused and eluted through the hydrated channel.

The above information disclosed in this Background section is only for enhancement of understanding of the background of the invention and accordingly it may include information that does not form the prior art that is already known in this country to a person of ordinary skill in the art.

SUMMARY

In one preferred aspect, provided is an additive capable of maintaining the performance of an electrolyte membrane and improving the durability thereof.

In further preferred aspect, provided is an additive capable of simultaneously improving the proton conductivity and antioxidation of an electrolyte membrane.

In further preferred aspect, provided is an additive capable of maintaining the function thereof for a long time without being eluted from the electrolyte membrane.

Embodiments of the present invention are not limited to the aforementioned objects. The object of the present invention will be further clarified by the following description, and achieved by the means described in the claims and a combination thereof.

In an aspect, provided is an electrolyte membrane for a membrane-electrode assembly that may include: an ionomer and an additive dispersed in the ionomer. Particularly, the additive may include a block copolymer that comprises a hydrophilic domain and a hydrophobic domain.

In a related aspects, an electrolyte membrane for a membrane-electrode assembly is provided that comprises: an admixture comprising: (a) an ionomer; and (b) a block copolymer comprising a hydrophilic domain and a hydrophobic domain.

The term "ionomer" as used herein refers to a polymeric material or resin that includes ionized groups attached (e.g. covalently bonded) to the backbone of the polymer as pendant groups. Preferably, such ionized groups may be functionalized to have ionic characteristics, e.g., cationic or anionic. The ionomer may suitably include one or more polymers selected from the group consisting of a fluoro-based polymer, a perfluorosulfone-based polymer, a benzimidazole-based polymer, a polyimide-based polymer, a polyetherimide-based polymer, a polyphenylene sulfide-based polymer, a polysulfone-based polymer, a polyethersulfone-based polymer, a polyetherketone-based polymer, a polyether-etherketone-based polymer, a polyphenylquinoxaline-based polymer and a polystyrene-based polymer.

The hydrophilic domain may include a cation conductivity repeat unit. For instance, the hydrophilic domain may comprise one or more repeat units that comprise acid groups such as sulphonic (—SO$_3^-$) group or phosphoric acid or other P-containing group.

In particular aspects, the cation conductivity repeat unit may include at least one of the repeat units having Formula 1-1 to Formula 1-5 below,

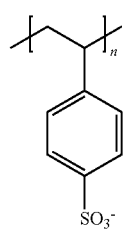

[Formula 1-1]

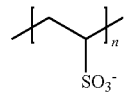

[Formula 1-2]

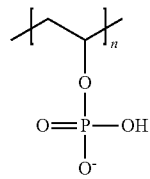

[Formula 1-3]

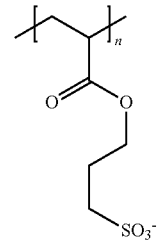

[Formula 1-4]

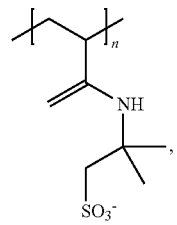

[Formula 1-5]

wherein n ranges from 1 to 100,000.

The hydrophobic domain may include an antioxidation repeat unit.

For instance, the hydrophobic domain may comprise one or more repeat units that comprise an oxidized nitrogen moiety, including an oxidized amine (amine oxide) including a secondary or tertiary oxidized amines such as those exemplified in Formula 2-1 to Formula 2-10 below.

The antioxidation repeat unit may include at least one of the repeat units having Formula 2-1 to Formula 2-10 below,

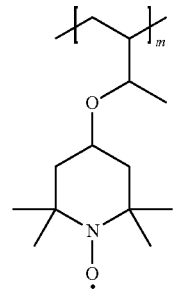

[Formula 2-1]

[Formula 2-2]

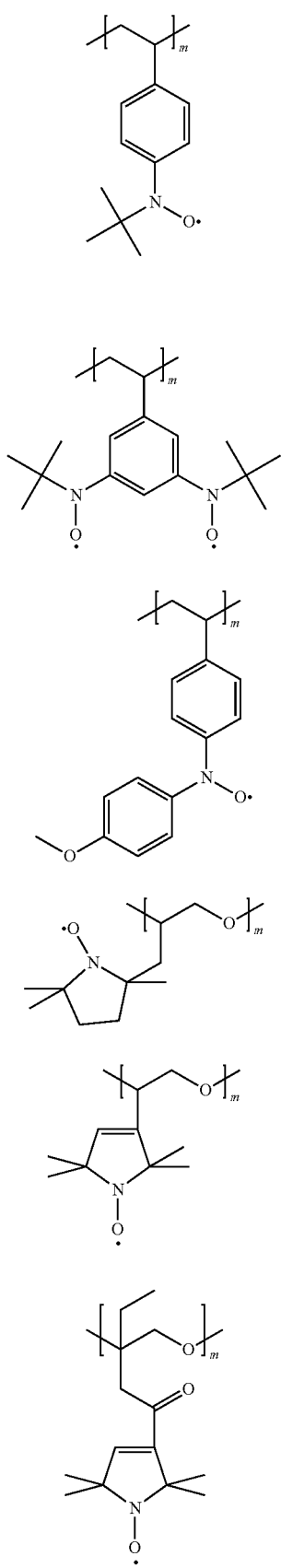

[Formula 2-3]

[Formula 2-4]

[Formula 2-5]

[Formula 2-6]

[Formula 2-7]

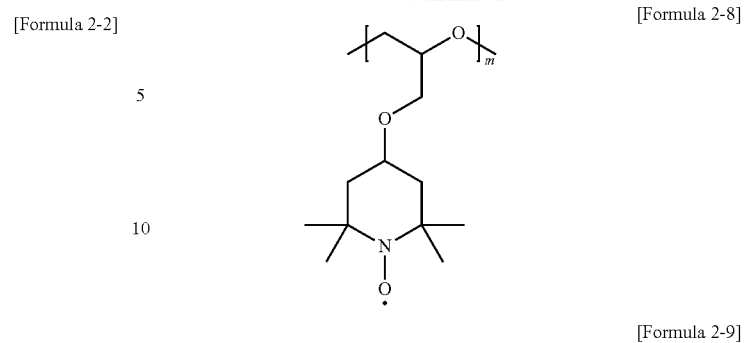

[Formula 2-8]

[Formula 2-9]

[Formula 2-10]

wherein m ranges from 1 to 100,000.

Preferably, a rate between a number of repeat units (n) of the hydrophilic domain and a number of repeat units (m) of the hydrophobic domain is of about 20:80 to 70:30.

The block copolymer may have the number average molecular weight (Mn) of about 25,000 or less.

The block copolymer may be formed in a micelle including a core part and a shell part surrounding the core part. The core part may include the hydrophobic domain, and the shell part may include the hydrophilic domain.

The block copolymer may have the particle radius of about 4 nm to 6 nm.

The electrolyte membrane may include the additive of about 1 part by weight to 10 parts by weight based on 100 parts by weight of the ionomer.

In an aspect, provided is a membrane-electrode assembly may include the electrolyte membrane described herein and a pair of electrodes located on both surfaces of the electrolyte membrane.

According to various exemplary embodiments, the membrane-electrode assembly may suitably be used in a fuel cell and/or a water electrolysis device.

In additional embodiments, a vehicle is provided that comprises a membrane-electrode assembly and/or fuel cell as disclosed herein.

According to various exemplary embodiments, the additive as described herein may simultaneously improve the proton conductivity and antioxidation of the electrolyte membrane. According to various exemplary embodiments, the additive as described herein (i.e. block copolymer comprising a hydrophilic domain and a hydrophobic domain) may maintain the function thereof for a long time without being eluted from the electrolyte membrane.

The effect of the present invention is not limited to the aforementioned effects. The effect of the present invention should be understood as including all effects inferable from the following description.

It is understood that the term "automotive" or "vehicular" or other similar term as used herein is inclusive of motor automotives in general such as passenger automobiles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels derived from resources other than petroleum). As referred to herein, a hybrid automotive is an automotive that has two or more sources of power, for example both gasoline-powered and electric-powered automotives.

The other aspects of the invention are discussed infra.

BRIEF DESCRIPTION OF THE DRAWINGS

The above and other features of the present invention will now be described in detail with reference to certain exemplary examples thereof illustrated in the accompanying drawings which are given herein below by way of illustration only, and thus are not limitative of the present invention, and wherein.

Figure 1:
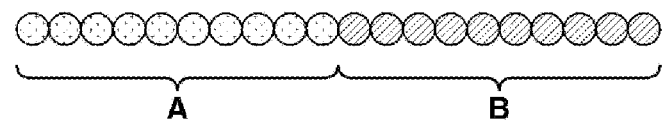
FIG. 1 shows an exemplary block copolymer according to an exemplary embodiment of the present invention.

It should be understood that the appended drawings are not necessarily to scale, presenting a somewhat simplified representation of various preferred features illustrative of the basic principles of the disclosure. The specific design features of the present invention as disclosed herein, including, for example, specific dimensions, orientations, locations, and shapes will be determined in section by the particular intended application and use environment.

In the figures, reference numbers refer to the same or equivalent sections of the present invention throughout the several figures of the drawing.

DETAILED DESCRIPTION

As described above, objects, other objects, features, and advantages according to the present invention will be readily understood through the following preferred embodiments associated with the accompanying drawings. However, the present invention is not limited to the Examples described herein and may also be embodied in other forms. Rather, the Examples introduced herein are provided so that the invention may be made thorough and complete, and the spirit according to the present invention may be sufficiently conveyed to those skilled in the art.

Similar reference numerals are used for similar components while describing each drawing. In the accompanying drawings, the dimensions of the structures are illustrated to be enlarged larger than the actual one for clarity of the present disclosure. The terms "first," "second," and the like may be used to illustrate various components, but the components should not be limited by the terms. The terms are used only to differentiate one element from another. For example, a first component may be referred to as a second component, and similarly, the second component may also be referred to as the first component without departing from the scope of the present disclosure. The singular forms may include plural forms unless the contexts clearly indicate the opposite.

In this specification, it should be understood that terms such as "comprise" or "have" are intended to indicate that there is a feature, a number, a step, an operation, a component, a part, or a combination thereof described on the specification, and do not exclude the possibility of the presence or the addition of one or more other features, numbers, steps, operations, components, parts, or combinations thereof in advance. Further, when a portion such as a layer, a film, an area, or a plate is said to be "on" another portion, this includes not only the case where the portion is "directly above" another portion but also the case where other portions are interposed therebetween. Conversely, when a portion such as a layer, a film, an area, or a plate is said to be "under" another portion, this includes not only the case where the portion is "directly under" another portion but also the case where other portions are interposed therebetween.

Unless otherwise indicated, all numbers, values, and/or expressions referring to quantities of ingredients, reaction conditions, polymer compositions, and formulations used herein are to be understood as modified in all instances by the term "about" as such numbers are inherently approximations that are reflective of, among other things, the various uncertainties of measurement encountered in obtaining such values. Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Further, where a numerical range is disclosed herein, such a range is continuous, and includes unless otherwise indicated, every value from the minimum value to and including the maximum value of such range. Still further, where such a range refers to integers, unless otherwise indicated, every integer from the minimum value to and including the maximum value is included. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

An electrolyte membrane for a membrane-electrode assembly may include an ionomer and an additive dispersed to the ionomer.

The ionomer as used herein may transfer protons within the electrolyte membrane.

The ionomer may include a perfluorinated sulfonic acid polymer having a functional group capable of transferring the protons such as nafion.

The additive may include a block copolymer illustrated in FIG. 1. The block copolymer may include a hydrophilic domain (A) and a hydrophobic domain (B).

The hydrophilic domain (A) may include a cation conductivity repeat unit.

The cation conductivity repeat unit is a repeat unit including a functional group such as a sulfonic acid group capable of transferring the proton, and may include one or more of the repeat units having Formula 1-1 to Formula 1-5 below.

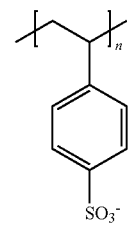

[Formula 1-1]

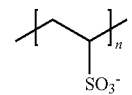

[Formula 1-2]

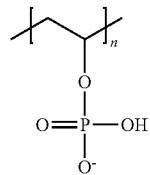

[Formula 1-3]

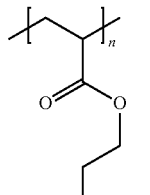

[Formula 1-4]

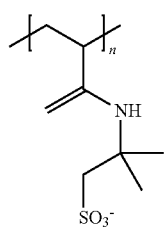

[Formula 1-5]

n ranges from 1 to 100,000.

The block copolymer including the hydrophilic domain (A) may provide the new movement path of the proton other than the ionomer within the electrolyte membrane, thereby largely improving the photon conductivity of the electrolyte membrane.

The hydrophobic domain (B) may include the antioxidation repeat unit.

The antioxidation repeat unit may have a partial structure capable of converting the hydroxyl radical into hydroxide through the reaction paths of Reaction Formula 1 and Reaction Formula 2 below, or decomposing hydrogen peroxide.

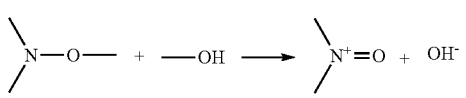

[Reaction Formula 1]

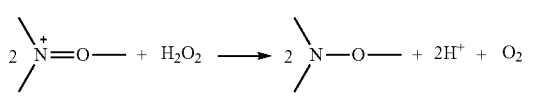

[Reaction Formula 2]

The antioxidation repeat unit may include one or more repeat units expressed by Formula 2-1 to Formula 2-10 below.

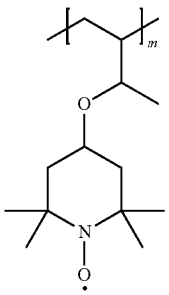

[Formula 2-1]

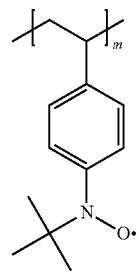

[Formula 2-2]

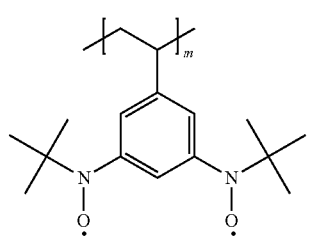

[Formula 2-3]

[Formula 2-4]

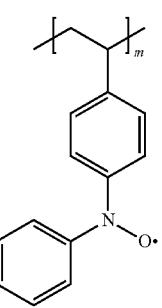

[Formula 2-5]

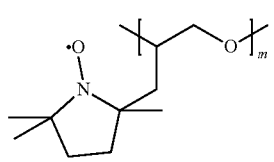

[Formula 2-6]

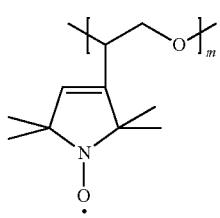

[Formula 2-7]

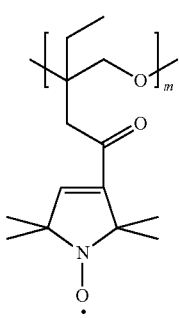

[Formula 2-8]

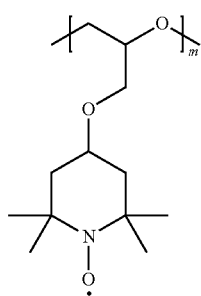

[Formula 2-9]

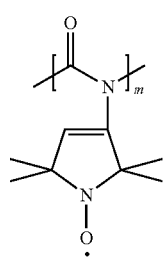

[Formula 2-10]

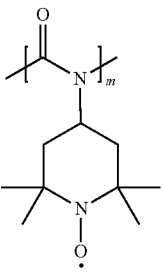

A rate between the number of repeat units (n) of the hydrophilic domain and the number of repeat units (m) of the hydrophobic domain (n:m) may be of about 20:80 to 70:30. When the rate of the number of repeat units (m) of the hydrophobic domain is greater than about 80, the particle radius of the block copolymer may become too large, such that the proton conductivity may not be improved.

Further, the block copolymer may have a number average molecular weight (Mn) of about 25,000 or less, about 10,000 or less, or about 8,000 or less. The lower limit of the number average molecular weight (Mn) is not specially limited. When the number average molecular weight of the block copolymer is greater than about 25,000, the particle radius of the block copolymer may become large, such that the proton conductivity may not be improved.

Figure 2:
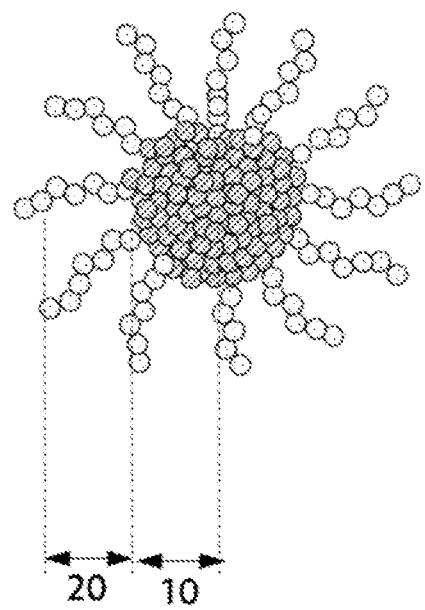
FIG. 2 shows the state where the block copolymer according to the present invention is self-assembled in a micelle form.

The electrolyte membrane exists in the humidified state, and the block copolymer includes all of the hydrophilic domain and the hydrophobic domain in one molecule. For example, as illustrated in FIG. 2, the block copolymer is self-assembled within the electrolyte membrane to form the micelle form including a core part 10 and a shell part 20 surrounding the core part 10.

The block copolymer may have the particle radius of about 4 nm to 6 nm. In the present specification, the "particle radius" refers to the linear distance from the center point of the micelle cell to the surface of the shell part in the state where the block copolymer is self-assembled in the micelle form. Further, the particle radius refers to the particle radius when the block copolymer is in the hydrated state. For example, according to a cluster-network model which is a fine molecular structure of the hydrated nafion, the absorbed water of the sulfonic acid group ($-SO_3^-$) forms a cluster of the spherical form having the diameter of about 4 nm, and the movement path of the proton is known as the narrow channel having 1 nm in width connecting the consecutive clusters. Therefore, to increase the proton conductivity, the particle radius of the block copolymer may be of about 4 nm to 6 nm, or particularly about 4 nm to 5 nm.

The electrolyte membrane may include the additive of 1 part by weight to 10 parts by weight based on 100 parts by weight of the ionomer. When the content of the additive is less than about 1 part by weight, the degree of improving the proton conductivity and the antioxidation may be insufficient, and when the content of the additive is greater than about 10 parts by weight, the amount thereof may be excessive, thereby rather lowering the proton conductivity of the electrolyte membrane.

Example

Exemplary embodiments of the present invention will be described in more detail through the exemplary examples below. The exemplary embodiment below is merely illustrative for helping to understand the present disclosure, and the scope of the present invention is not limited thereto.

Manufacturing Example 1 to Manufacturing Example 3

The block copolymer was manufactured in the following method.

As a monomer of the hydrophobic domain, 2,2,6,6-Tetramethyl-4-piperidinyl methacrylate expressed by Formula 3 below was used as a hydrophobic monomer.

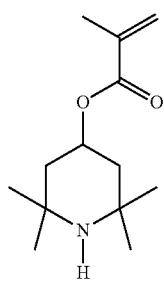

[Formula 3]

As a monomer of the hydrophilic domain, sodium 4-vinylbenzenesulfonate expressed by Formula 4 below was used as a hydrophilic monomer.

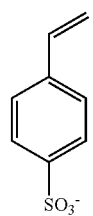

The block copolymer was synthesized by a reversible addition-fragmentation chain transfer (RAFT) below.

First, the hydrophobic monomer of 10 g (0.04 moles), 2,2'-azobis(2-methylpropionitrile) (AIBN) of 0.146 g (0.8 moles) and 4-cyano-4-(phenylcarbonothioylthio)pentanoic acid of 1.117 g (0.01 moles) were input into anhydrous toluene of 20 mL, the dissolved oxygen was removed, and then the argon purging was performed. After the 5-hour reaction at a temperature of about 55 to 75° C., the polymerization was completed after cooling. After the reactant was precipitated in a hexane solvent, a sediment was obtained by the centrifugation, and dried in a decompression oven for a day to obtain an intermediate expressed by Formula 5 below.

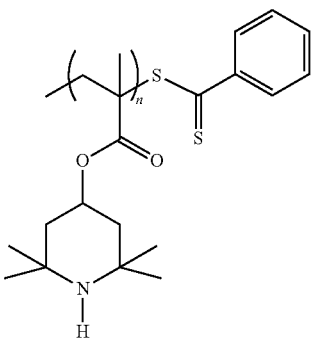

[Formula 5]

The intermediate of 0.02 moles, the hydrophilic monomer, and AIBN of 0.146 g (0.8 moles) were input into the solvent of mixing water with methanol. At this time, the samples in which the input amount of the hydrophilic monomer was adjusted to 0.01 moles (Manufacturing Example 1), 0.02 moles (Manufacturing Example 2), and 0.04 moles (Manufacturing Example 3) were manufactured, respectively.

After each sample was reacted for 5 hours at a temperature of about 55 to 75° C., the polymerization was completed by the cooling. After the reactant was precipitated into the hexane solvent, the precipitate was obtained by the centrifugation, and dried for a day in the depression oven, such that the copolymer was obtained.

The copolymer of 5 g, and meta-chloroperoxybenzoic acid (mCPBA) of 17.25 g (0.1 moles) were input into dichloromethane of 50 mL, and agitated for 12 hours at room temperature, such that the copolymer was oxidized. After the reactant was precipitated in the hexane solvent, the precipitate was obtained by the centrifugation, and dried for a day in the depression oven, such that the block copolymer according to an exemplary embodiment of the present invention expressed by Formula 6 below was obtained.

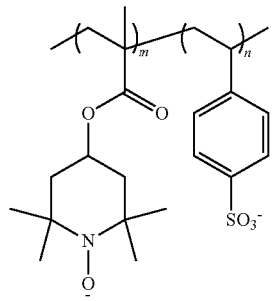

[Formula 6]

The physical properties for the block copolymers of the Manufacturing Example 1, the Manufacturing Example 2, and the Manufacturing Example 3 were measured. The result is expressed in Table 1 below.

TABLE 1

| Items | m/n[1] | Number average molecular weight [2] | Particle radius [nm] |
|---|---|---|---|
| Manufacturing Example 1 | 43/57 | 6,000 | 2.3 |
| Manufacturing Example 2 | 31/69 | 8,000 | 3.4 |

TABLE 1-continued

| Items | m/n[1] | Number average molecular weight [2] | Particle radius [nm] [3] |
|---|---|---|---|
| Manufacturing Example 3 | 73/27 | 23,000 | 5.2 |

[1] The rate (m/n) of the number of repeat units (n) of the hydrophilic domain and the number of repeat units (m) of the hydrophobic domain, measured by $^1$H-NMR
[2] Measured by DOSY-NMR
3) Measured by a dynamic light scattering (DLS)

Example 1 to Example 4 and Comparative Example

Nafion solution was prepared. Mixtures were manufactured by adding the block copolymer of the Manufacturing Example 1 by 1 part by weight (Example 1), 3 parts by weight (Example 2), 5 parts by weight (Example 3), and 10 parts by weight (Example 4) based on 100 parts by weight of the nafion (ionomer) included in the nafion solution, respectively.

The electrolyte membrane was manufactured by applying each mixture on a release paper, and drying and thermally treating the mixture.

The electrolyte membrane was manufactured with only the nafion solution without adding the block copolymer, and set as the Comparative Example.

Experimental Example 1—Proton Conductivity Measurement

The proton conductivity of the electrolyte membranes according to the Example 1 to the Example 4 and the Comparative Example are measured in an in-plane in the condition of 80° C. and the relative humidity of 50%. The result is expressed by Table 2 below.

TABLE 2

| Items | Content of block copolymer | Thickness of electrolyte membrane | Proton conductivity |
|---|---|---|---|
| Comparative Example | 0 part by weight | 28 um | 45.1 mS/cm |
| Example 1 | 1 part by weight | 24 um | 46.5 mS/cm |
| Example 2 | 3 parts by weight | 28 um | 48.6 mS/cm |
| Example 3 | 5 parts by weight | 26 um | 51.4 mS/cm |
| Example 4 | 10 parts by weight | 31 um | 38.2 mS/cm |

As shown in Table 2, the Example 3 shows the highest proton conductivity, and this is a value increased by about 6 mS/cm compared to the Comparative Example.

Experimental Example 2—Antioxidation Evaluation

The antioxidation was evaluated by measuring the changes in the fluorine ion emission according to the times of the electrolyte membranes according to the Example 1 to the Example 4 and the Comparative Example. The result is illustrated in FIG. 3.

Figure 3:
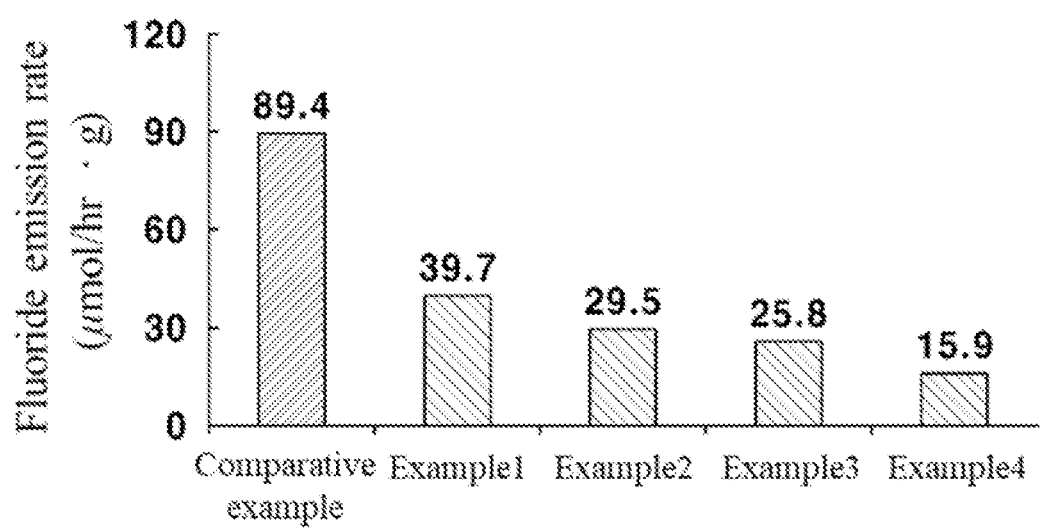
FIG. 3 shows the antioxidation evaluation result according to an Experimental Example 2.

As shown in FIG. 3, the Example 1 to the Example 4 show the remarkably low fluorine ion emission compared to the Comparative Example, such that it may be seen that when the block copolymer according to an exemplary embodiment of the present invention is input as an additive, the chemical durability of the electrolyte membrane may be largely improved.

As described above, the Experimental Examples and the Examples according to various exemplary embodiments of the present invention have been described in detail, and the scope of the present invention is not limited to the aforementioned Experimental Examples and the Examples, and various forms modified and improved by those skilled in the art using the basic concept of the present invention defined by the claims are also included in the scope of the present invention.

What is claimed is:

1. An electrolyte membrane for a membrane-electrode assembly comprising:
   an admixture comprising:
   (a) an ionomer; and
   (b) a block copolymer comprising a hydrophilic domain and a hydrophobic domain,
   wherein the hydrophobic domain comprises an antioxidation repeat unit, and
   wherein the antioxidation repeat unit comprises an oxygen radical bonded to nitrogen.

2. The electrolyte membrane for the membrane-electrode assembly of claim 1,
   wherein the hydrophilic domain comprises a cation conductivity repeat unit.

3. The electrolyte membrane for the membrane-electrode assembly of claim 2,
   wherein the cation conductivity repeat unit comprises one or more repeat units having Formula 1-1 to Formula 1-5 below,

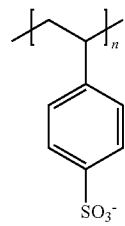

[Formula 1-1]

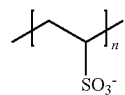

[Formula 1-2]

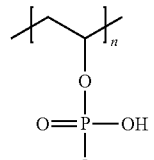

[Formula 1-3]

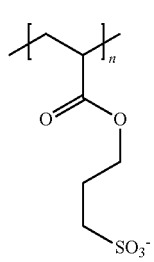

[Formula 1-4]

[Formula 1-5]

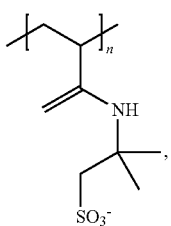

wherein n ranges from 1 to 100,000.

4. The electrolyte membrane for the membrane-electrode assembly of claim 1,
wherein the antioxidation repeat unit comprises one or more repeat units having Formula 2-1 to Formula 2-10 below,

[Formula 2-1]

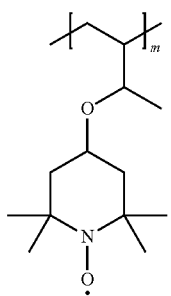

[Formula 2-2]

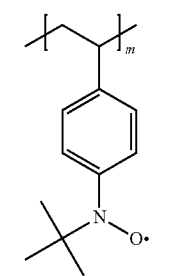

[Formula 2-3]

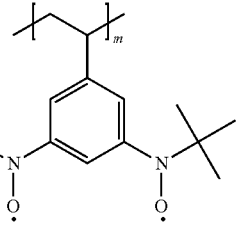

[Formula 2-4]

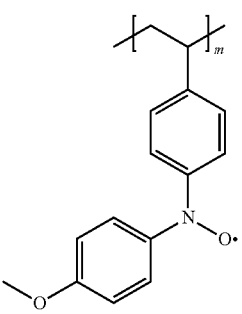

[Formula 2-5]

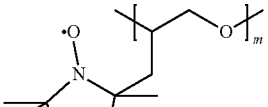

[Formula 2-6]

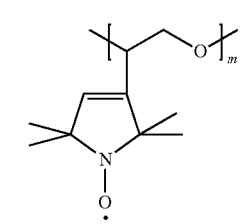

[Formula 2-7]

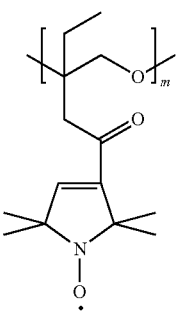

[Formula 2-8]

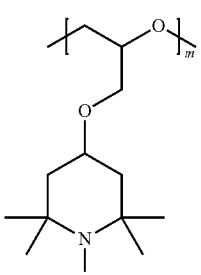

[Formula 2-9]

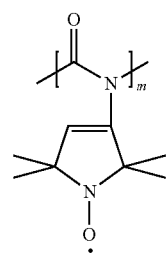

[Formula 2-10]

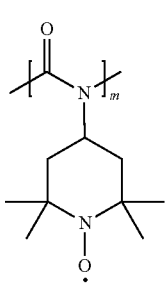

wherein m ranges from 1 to 100,000.

5. The electrolyte membrane for the membrane-electrode assembly of claim 1, wherein a ratio between the number of repeat units (n) of the hydrophilic domain and the number of repeat units (m) of the hydrophobic domain is 20:80 to 70:30.

6. The electrolyte membrane for the membrane-electrode assembly of claim 1,
wherein the block copolymer has the number average molecular weight (Mn) of 25,000 or less.

7. The electrolyte membrane for the membrane-electrode assembly of claim 1,
wherein the block copolymer is formed in a micelle comprising a core part and a shell part surrounding the core part, and
wherein the core part comprises the hydrophobic domain, and the shell part comprises: the hydrophilic domain.

8. The electrolyte membrane for the membrane-electrode assembly of claim 1,
wherein the block copolymer has a particle radius of nm to 6 nm.

9. The electrolyte membrane for the membrane-electrode assembly of claim 1,
wherein the block copolymer of 1 part by weight to 10 parts by weight based on 100 parts by weight of the ionomer are comprised.

10. A membrane-electrode assembly comprising:
an electrolyte membrane of claim 1; and
a pair of electrodes located on both surfaces of the electrolyte membrane.

11. A fuel cell comprising: the membrane-electrode assembly of claim 10.

12. A water electrolysis device comprising: the membrane-electrode assembly of claim 10.

13. A vehicle comprising a membrane-electrode assembly of claim 10.

14. A vehicle comprising a fuel cell of claim 11.

15. An electrolyte membrane for a membrane-electrode assembly comprising:
an admixture comprising:
(a) an ionomer; and
(b) a block copolymer comprising a hydrophilic domain and a hydrophobic domain,
wherein the hydrophobic domain comprises an antioxidation repeat unit,
wherein the block copolymer is formed in a micelle comprising a core part and a shell part surrounding the core part, and
wherein the core part comprises the hydrophobic domain, and the shell part comprises: the hydrophilic domain.

16. The electrolyte membrane for the membrane-electrode assembly of claim 15,
wherein the antioxidation repeat unit comprises one or more repeat units having Formula 2-1 to Formula 2-10 below,

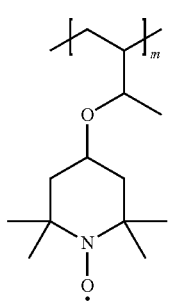

[Formula 2-1]

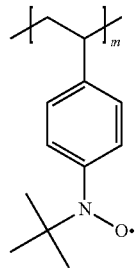

[Formula 2-2]

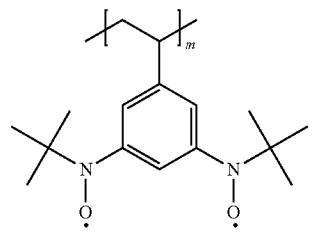

[Formula 2-3]

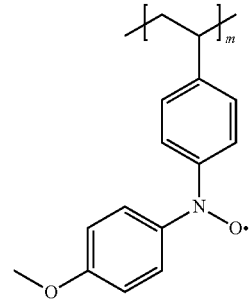

[Formula 2-4]

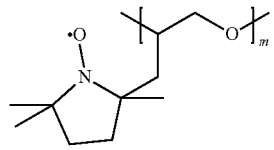

[Formula 2-5]

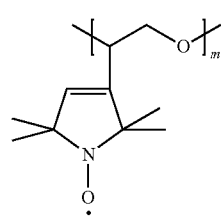

[Formula 2-6]

[Formula 2-7]
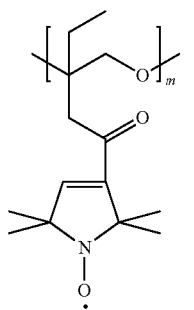
[Formula 2-8]
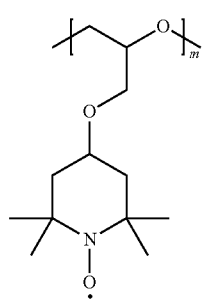
[Formula 2-9]
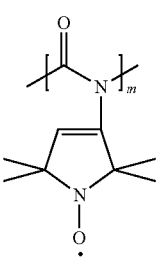
[Formula 2-10]
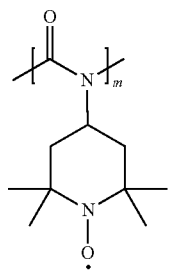
* * * * *